UNITED STATES PATENT OFFICE 2,380,591

AMINO ACIDS IN EMULSION POLYMERIZATION

Charles F. Fryling, Silver Lake, Ohio, assignor to The B. F. Goodrich Company, New York, N. Y., a corporation of New York No Drawing. Application May 21, 1940, Serial No. 336,404

16 Claims. (Cl. 260—84.5)

This invention relates to the use of amino acids in the emulsion polymerization of butadiene-1,3 hydrocarbons and has as its principal object to provide an improved method of polymerization.

It is known that elastic vulcanizable polymers which may be termed synthetic rubber are produced by the polymerization in aqueous emulsion of monomeric materials which consist predominantly of butadiene-1,3 hydrocarbons, such as butadiene-1,3, hereinafter called butadiene, isoprene (3-methyl butadiene-1,3), dimethyl butadiene (2,3-dimethyl butadiene-1,3) and the like. Such monomeric materials may consist wholly of butadiene-1,3 hydrocarbons or a mixture of these or they may consist of mixtures of such hydrocarbons with lesser amounts of other unsaturated organic compounds capable of copolymerizing therewith in aqueous emulsion to form rubbery materials among which are acrylic nitriles such as acrylonitrile, methacrylonitrile and ethacrylonitrile; aryl olefins such as styrene and vinyl naphthalene; esters of acrylic and substituted acrylic acids such as methyl, ethyl and butyl acrylate or methacrylate; vinyl ketones such as methyl vinyl ketone; unsaturated esters containing at least two olefinic double bonds separated by the ester linkage such as allyl crotonate and diallyl adipate and other similar unsaturated monomers.

In the production of synthetic rubber from such monomeric materials it is convenient to emulsify the monomers in water by means of a suitable emulsifying agent such as a soap solution containing a polymerization catalyst such as hydrogen peroxide, and then to allow the emulsified ingredients to polymerize. After polymerization the rubber is obtained as a latex-like emulsion which may be coagulated to give the solid rubber-like polymer. By the use of this general procedure, however, it is frequently necessary to allow rather long reaction times, namely several days, and to employ temperatures above room temperature in order to obtain good yields of the synthetic rubber.

I have now discovered that the polymerization of monomeric materials consisting predominantly of a butadiene-1,3 hydrocarbon in water emulsion can be greatly accelerated and the rubber-like polymers substantially improved if the operation is conducted in the presence of an alpha amino carboxylic acid or the alkali salts of such acids. A considerable increase in yield of the polymerization products is also obtained under otherwise similar conditions, and lower temperatures for the polymerization may be used by the practice of this invention.

The compounds useful for this purpose are members of the class of compounds which consists of aliphatic alpha amino carboxylic acids, aliphatic alpha amino carboxylic acids containing other hydroxyl, amino or carboxyl substituents, and the alkali metal salts of such acids. This class of compounds is characterized by the presence of a primary amino group in the alpha position to a carboxyl group or to a carboxyl group whose hydrogen is substituted by an alkali metal. Structurally this class of compounds may be represented by the formula

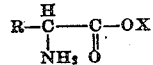

wherein R may be hydrogen, an alkyl radical or an alkyl radical containing one or more hydroxyl, amino or carboxyl substituents. This class of compounds is referred to hereinafter in the specification and claims in a generic sense simply as aliphatic alpha amino carboxyl acids. Typical examples of compounds in this class are found in the following list. (It is to be remembered that in each case the alkali metal salt of the acid or the free acid may be used.)

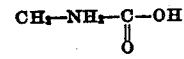

Glycine

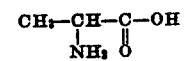

Alanine

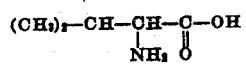

Valine

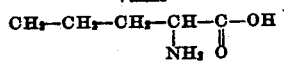

Nor-valine

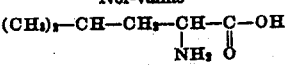

Leucine

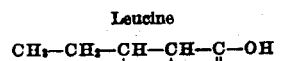

Iso leucine

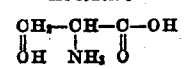

Serine

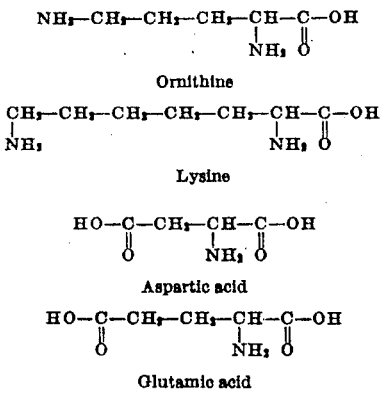

Ornithine

Lysine

Aspartic acid

Glutamic acid

The preferred compounds are the monoamino, monocarboxylic acids or their alkali metal salts such as glycine or alanine.

In addition to the monomers and the alpha amino acid, there may also be present in the emulsion to be polymerized the usual emulsifying agents, polymerization catalysts and other substances which are desired. For example such emulsifying agents as fatty acid soaps, partially neutralized fatty acid soaps, hymolal sulfates or sulfonates, salts of aromatic sulfonic acids, salts of high molecular weight organic bases and the like may be used to effect emulsification without influencing the action of the alpha amino acid.

Polymerization catalysts which are known to accelerate linear polymerization of dienes in emulsion may also be employed along with the alpha amino acid. Although it is not absolutely essential that a catalyst be added as such to the emulsion, it is desirable that a catalyst be present. The preferred catalysts are the per-oxygen catalysts such as organic peroxides, per-salts like persulfates, perborates and percarbonates and, in particular, hydrogen peroxide. While using hydrogen peroxide in connection with an alpha amino acid a much more rapid and smooth polymerization is brought about than by using hydrogen peroxide alone. Since the action of the amino acid is probably related in some way to the catalytic action of the peroxide, the amino acids may be referred to as catalyst activators.

Various other materials which are added for some special purpose or substances which direct the polymerization in a preferred manner may also be used in connection with the amino acid without destroying the beneficial results brought about by the latter. It may also be desirable to adjust the acidity of the emulsion.

The amount of the amino acid which should be added to the emulsion to bring about the most desirable results will depend upon the other substances present and upon the particular amino acid to be employed. The concentration of the amino acid is not critical but may be varied over a wide range. It has been found however, that the addition of about ½ to 2 moles of the alpha amino acid for each mole of the catalyst is to be preferred. This corresponds to an amount of amino acid equal to from 0.5 to 2% of the weight of the monomers.

The method of carrying out this invention and the conditions to be utilized in its practice may be illustrated by the following examples in which the parts are by weight.

Example 1.—An emulsion containing 60 parts of butadiene, 40 parts of methyl methacrylate, 250 parts of a 2% aqueous solution of sodium palmitate, 0.2 part of hydrogen peroxide and 1.0 part of glycine was agitated in a closed container for 48 hours at 30° C. Upon coagulation of the resulting latex-like emulsion a plastic rubber-like polymer was obtained in quantitative yield. Another emulsion containing the same ingredients with the exception of glycine required 168 hours to bring about polymerization. Moreover, the polymer prepared in the presence of glycine, when compounded and vulcanized, possessed higher tensile strength than the polymer obtained by polymerization in the absence of glycine.

Example 2.—An emulsion (A) made up as follows was polymerized as in Example 1.

| | Parts |
|---|---|
| Butadiene | 70 |
| Styrene | 30 |
| Hydrogen peroxide | .35 |
| Sodium palmitate (2% aqueous) | 250 |
| Glycine | 1.0 |

A similar emulsion (B) containing no glycine was also polymerized. A comparison of the two polymerizations follows:

| | Temp. | Time | Yield |
|---|---|---|---|
| | °C. | Hours | Per cent |
| (A) | 30 | 58 | 99 |
| (B) | 40 | 120 | 79 |

The vulcanizate obtained from the polymer in (A) was over 1,000 lbs./sq. in. higher in tensile strength than the similar vulcanizate from (B).

Example 3.—A mixture of 75 parts of butadiene and 25 parts of acrylonitrile was emulsified with 250 parts of a 2% solution of a mixture of fatty acid soaps known commercially as "Ivory" soap. There was added to the emulsion 0.35 part of hydrogen peroxide and 0.5 part of glycine. A 98% yield of a synthetic rubber was obtained in 70 hours at 30° C. Without glycine only an 83% yield in 104 hours resulted.

The improvement in polymerization brought about by an alpha amino acid is apparent from the foregoing examples. Another advantage to be gained by the practice of this invention is that the inhibiting effect of foreign substances is substantially reduced by the presence of the alpha amino acid. For example, small concentrations of copper salts exert a deleterious effect on polymerizations carried out in the presence of soap and hydrogen peroxide. The addition of an alpha amino acid to this system, however, brings about polymerization and mitigates the inhibitive effect of the copper salt.

Many modifications and variations of this invention will occur to those skilled in the art. Accordingly, it is not intended that the invention be limited to the specific examples described herein, but only by the scope of the appended claims.

I claim:

1. The process which comprises polymerizing a monomeric material consisting predominantly of a butadiene-1,3 hydrocarbon in an aqueous emulsion in the presence of a saturated aliphatic alpha-amino carboxylic acid.

2. The process which comprises polymerizing a monomeric material consisting predominantly of a butadiene-1,3 hydrocarbon in aqueous emulsion in the presence of an emulsifying agent, an emulsion polymerization catalyst and a saturated aliphatic alpha-amino carboxylic acid.

3. The process which comprises polymerizing a mixture of a butadiene-1,3 hydrocarbon and a lesser amount of another unsaturated organic compound capable of copolymerizing therewith in aqueous emulsion to form a rubbery material, in an aqueous emulsion in the presence of hydrogen peroxide and a saturated aliphatic alpha-amino carboxylic acid.

4. The process which comprises polymerizing a mixture of a butadiene-1,3 hydrocarbon and a lesser amount of another unsaturated organic compound capable of copolymerizing therewith in aqueous emulsion to form a rubber material, in an aqueous emulsion in the presence of a saturated aliphatic monoamino monocarboxylic alpha-amino acid.

5. The process which comprises polymerizing a monomeric material consisting predominantly of a butadiene-1,3 hydrocarbon in aqueous emulsion in the presence of an emulsifying agent, an emulsion polymerization catalyst and a saturated aliphatic monoamino monocarboxylic alpha-amino acid.

6. The process which comprises polymerizing a monomeric material consisting predominantly of butadiene in aqueous emulsion in the presence of glycine.

7. The process which comprises polymerizing a mixture of butadiene and a lesser amount of another unsaturated organic compound capable of copolymerizing therewith in aqueous emulsion to form a rubbery material, in aqueous emulsion in the presence of an emulsion polymerization catalyst and glycine.

8. The process which comprises polymerizing a mixture of butadiene and a lesser amount of styrene in an aqueous emulsion containing hydrogen peroxide and glycine.

9. The process which comprises polymerizing a mixture including butadiene and a lesser amount of methyl methacrylate in an aqueous emulsion in the presence of a saturated aliphatic alpha amino carboxylic acid.

10. The process which comprises polymerizing a mixture including butadiene and a lesser amount of styrene in an aqueous emulsion in the presence of a saturated aliphatic alpha amino carboxylic acid.

11. The process which comprises polymerizing a mixture including butadiene and a lesser amount of acrylonitrile in an aqueous emulsion in the presence of a saturated aliphatic alpha amino carboxylic acid.

12. The process which comprises polymerizing a mixture including butadiene and a lesser amount of methyl methacrylate in an aqueous emulsion containing hydrogen peroxide and glycine in such proportion that from ½ to 2 moles glycine are present for each mole of hydrogen peroxide.

13. A synthetic rubber of improved quality prepared by the polymerization of a monomeric material consisting predominantly of a butadiene-1,3 hydrocarbon, said polymerization being effected in aqueous emulsion in the presence of a saturated aliphatic alpha-amino carboxylic acid.

14. A synthetic rubber prepared by the polymerization of butadiene and a lesser amount of methyl methacrylate, said polymerization being effected in aqueous emulsion in the presence of a saturated aliphatic alpha-amino carboxylic acid.

15. A synthetic rubber prepared by the polymerization of butadiene and a lesser amount of acrylonitrile, said polymerization being effected in aqueous emulsion in the presence of a saturated aliphatic alpha-amino carboxylic acid.

16. A synthetic rubber prepared by the polymerization of butadiene and a lesser amount of styrene, said polymerization being effected in aqueous emulsion in the presence of a saturated aliphatic alpha-amino carboxylic acid.

CHARLES F. FRYLING.